United States Patent
Levi et al.

(10) Patent No.: US 9,477,582 B2
(45) Date of Patent: Oct. 25, 2016

(54) EXECUTABLE SOFTWARE SPECIFICATION GENERATION

(71) Applicant: Hewlett-Packard Development Company, L.P., Houston, TX (US)

(72) Inventors: Ithai Levi, Shoham (IL); Yair Horovitz, Mazkeret Batya (IL); Zohar Adler, Nes-Ziona (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/415,632

(22) PCT Filed: Oct. 31, 2012

(86) PCT No.: PCT/US2012/062776
§ 371 (c)(1),
(2) Date: Jan. 19, 2015

(87) PCT Pub. No.: WO2014/070165
PCT Pub. Date: May 8, 2014

(65) Prior Publication Data
US 2015/0234732 A1    Aug. 20, 2015

(51) Int. Cl.
*G06F 9/44* (2006.01)
*G06F 11/36* (2006.01)

(52) U.S. Cl.
CPC ............. *G06F 11/3684* (2013.01); *G06F 8/38* (2013.01); *G06F 11/3676* (2013.01)

(58) Field of Classification Search
CPC ........... G06F 11/3664; G06F 11/3684; G06F 11/3676; G06F 8/38

USPC .................................................. 717/125–127
See application file for complete search history.

(56) References Cited

U.S. PATENT DOCUMENTS

| | | | |
|---|---|---|---|
| 6,243,835 B1 | 6/2001 | Enokido | |
| 7,213,230 B2 * | 5/2007 | Harel | G06F 8/10 717/113 |
| 2009/0132994 A1 | 5/2009 | Doggett | |
| 2009/0319318 A1 * | 12/2009 | Estefania | G06Q 10/0635 705/325 |
| 2010/0223604 A1 * | 9/2010 | Kuan | G06F 8/314 717/141 |
| 2011/0010645 A1 | 1/2011 | Mihalcea | |
| 2011/0015964 A1 | 1/2011 | Ramdattan et al. | |
| 2011/0107243 A1 | 5/2011 | Jain et al. | |
| 2012/0151433 A1 | 6/2012 | Amodio et al. | |
| 2012/0210295 A1 | 8/2012 | Crisp | |

OTHER PUBLICATIONS

Korean Intellectual Property Office, International Search Report and Written Opinion, May 1, 2013, 10 pages, KIPO, Daejeon Metropolitan City, Republic of Korea.
E. R. Luna et al., Introducing Usability Requirements in a Test/Model-Driven Web Engineering Method, Jun. 2010, pp. 132-156.

(Continued)

*Primary Examiner* — Anna Deng
(74) *Attorney, Agent, or Firm* — Brooks, Cameron & Huebsch, PLLC

(57) ABSTRACT

Executable software specification generation can include recording interactions with a user-interface (UI) mockup for a particular program and generating a number of executable software specification for the particular program based on the interactions with the UI mockup.

16 Claims, 3 Drawing Sheets

(56) References Cited

OTHER PUBLICATIONS

Y. K. Lai, Bailey Testing Framework an Automated Graphic Based GUI Testing Framework for TDD Process, May 10, 2011, 14 pages.

J. M Rivero, et al., From Mockups to User Interface Models: an Extensible Model Driven Approach, Jun. 8, 2010, pp. 13-24.

Supplemental European Search Report, European Patent Application No. 12887324.7, Mar. 14, 2016, 8 pages.

* cited by examiner

EXECUTABLE SOFTWARE SPECIFICATION GENERATION

PRIORITY APPLICATION INFORMATION

This application is a National Stage Application under 35 U.S.C. §371 of International Application Number PCT/US2012/062776, filed Oct. 31, 2012 and published as WO 2014/070165 on May 8, 2014, the entire contents of which are incorporated herein by reference in its entirety.

BACKGROUND

A particular program can be developed using test-driven development (TDD) that can rely on a repetition of development cycles. The development cycles can include a developer and a quality assurance personnel collaborating over a number of cycles to develop a program. For example, the developer can write a test program with desired features and the test program can be reviewed by quality assurance personnel. In this example, the quality assurance personnel can give feedback to the developer and then the developer can use the feedback to correct errors and/or increase performance.

DETAILED DESCRIPTION

Figure 1:
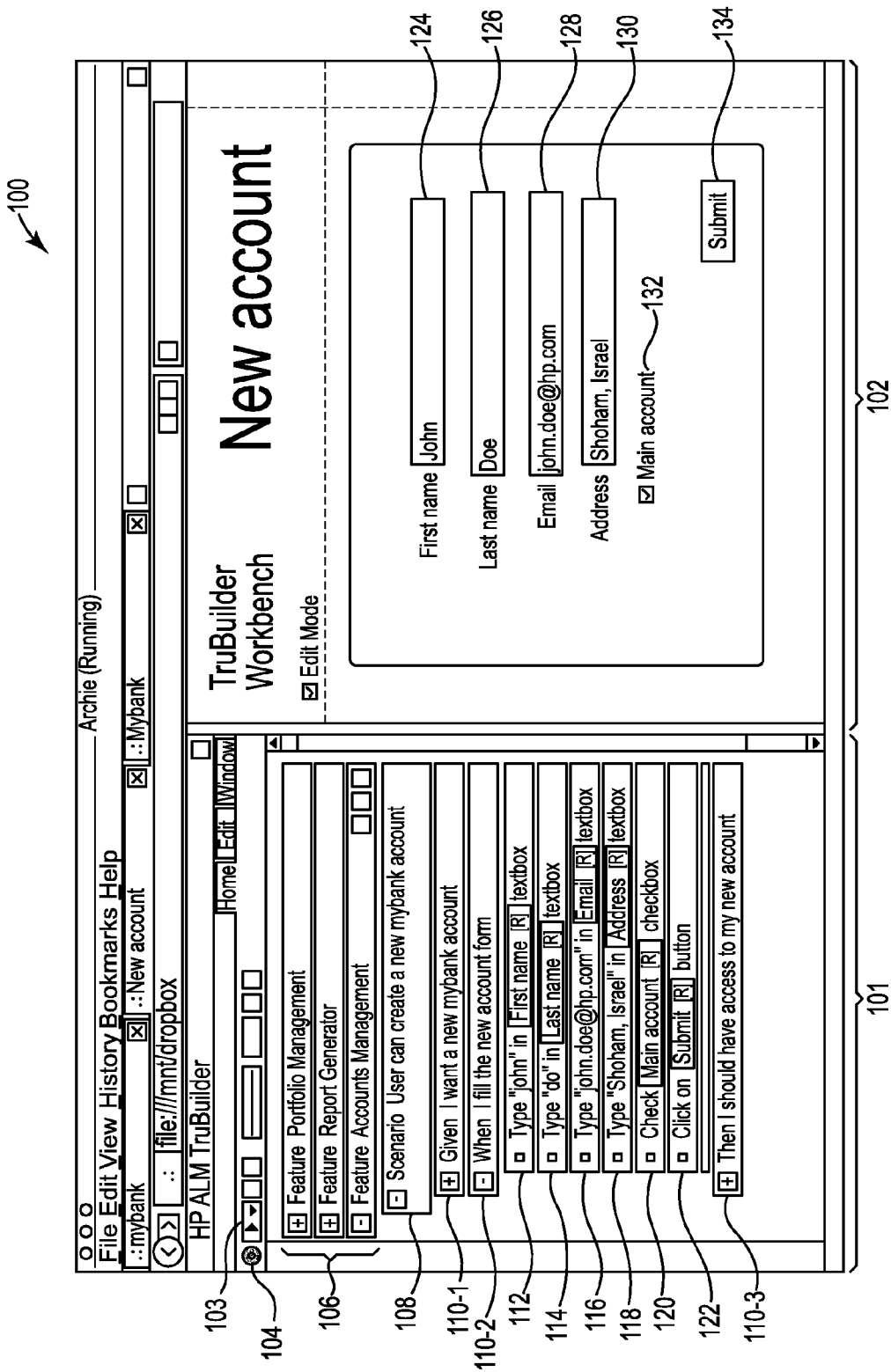
FIG. 1 illustrates a display of an example of a user interface mockup recorder according to the present disclosure.

User interface (UI) mockup recorders can be used to record user interactions with a UI mockup. A UI mockup can include a design program that can be used to create a UI design for a particular program without providing functionality for the UI. For example, a UI mockup design for an account creation web page and/or an application can be created that visually appears like a functional web page and/or application. However, in this example, the UI mockup may not be functional to create accounts for the web page and/or application. The UI mockup can be similar to an image file of a particular UI that is in a development stage. The design for the web page and/or application can include a number of features for the web page and/or application. For example, the number of features can include, but are not limited to, edit boxes, buttons, lists, links, graphics, UI widgets, etc. The design can be a template (e.g., features in a particular location, etc.) that can be used by a software developer to create the UI. For example, a web page designer can create the template for a UI that includes particular features that are desired for the web page and/or application at desired locations on the web page UI.

The UI mockup can be coupled to a recorder to create a UI mockup recorder. The UI mockup recorder can be used to record interactions with the UI mockup. For example, the UI mockup can include a user login and the recorder can record an interaction of logging into the UI mockup. In this example the interaction can be selecting a feature and typing in the user name and password. The recorder can record the interaction of selecting the feature and typing in the user name and password with a corresponding particular function that results from typing in the user name and password. The particular function can include directing the UI to a new page, creating a new user profile, etc.

The recorded interactions with corresponding functions can be used to generate an executable software specification. For example, a UI mockup recorder can generate the executable software specification for corresponding functions based on the recorded interactions with a UI mockup. The executable software specification can act as a test script and a number of program requirements. For example, the executable software specification can be executed as a test script and include various program requirements of a particular UI (e.g., UI that is being developed by designing the UI mockup, etc.). The executable software specification can be used to execute a number of functional tests (e.g., executed to determine a function, etc.) and load tests (e.g., executed to determine a load on a computing device, etc.) for the program. The number of program requirements can include a number of desired functions and/or desired features of the program. For example, the number of program requirements can include creating a new user profile after filing in a particular form within the UI.

The executable software specification can be reviewed and analyzed by a developer (e.g., program developer, web page developer, etc.). Analyzing the executable automation can include viewing a snapshot of the number of interactions to determine a desired UI for the particular program. Viewing the snapshots of the number of interactions can include viewing a flow of snapshots to display the number of interactions continuously from a beginning of a particular scenario to an end of the particular scenario. For example, the snapshots can be displayed as the executable software specification is executed by a UI mockup recorder to display the interactions of a particular scenario.

Analyzing the executable automation can also include performing a number of performance tests. The number of performance tests can detect problems with the executable software specification. The UI mockup recorder can enable a more direct interaction between UI designers, developers, product owners, business analysts, and quality assurance (QA) personnel compared to previous methods. For example, the UI mockup recorder can be used by a UI designer, who may not have coding skills, to create a visual representation as a UI mockup and then be used by a UI developer to develop the executable computer readable instructions for the UI.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of interactions" can refer to one or more interactions.

FIG. 1 illustrates a display 100 of an example of a user interface mockup recorder according to the present disclosure. The display 100 can include a UI mockup 102. The UI mockup 102 can be used to design a UI template that includes a number of features (e.g., features 124, 126, 128, 130, 132, 134, etc.) placed in a desired location (e.g., top of the screen, centered, etc.).

The UI mockup 102 can be designed as a visual representation of what a particular functional UI may look like. For example, UI mockup 102 can represent a new account screen with entry fields to accept text. In this example, the UI mockup 102 can include a first name feature 124 to insert text of a user's first name. The UI mockup can be designed to include any number of features including a last name feature 126, email address feature 128, address feature 130, main account check box 132, and a submit button 134, among other desired features.

The display 100 can include a UI mockup recorder 101. The UI mockup recorder 101 can include a list of a number of automation steps 106. The list of the number of automation steps 106 can include a scenario with a number of features that are related to performing the automation steps 106. For example, a scenario 108 can include each of the number of features within the UI mockup 102 (e.g., features 124, 126, 128, 130, 132, 134, etc.).

The list of the number of automation steps 106 can include a description of a scenario. For example, scenario 108 can include a description that includes "user can create a new mybank account". The description can be used to give a general description of the automation step. For example, scenario 108 can include a number of features for creating a new account (e.g., first name feature 124, last name feature 126, etc.).

An automation step can be selected to view a number of scenarios, options and/or features for performing the automation step. For example, selecting an accounts management automation step can display scenario 108. In this example scenario 108 can also be selected to display a "Given" option 110-1, a "When" option 110-2, and/or a "Then" option 110-3. The "Given" option 110-1, "When" option 110-2, and "Then" option 110-3 can enable a user to define a desired function (e.g., "Given" option 110-1) from a number of particular interactions (e.g., "When" option 110-2) that create a particular result (e.g., "Then" option 110-3).

The "Given" option 110-1 can include a desired function. For example, the desired function can include creating a new account. The desired function can directly relate to the automation step. For example, automation step 108 is labeled "user can create a new mybank account" and the "Given" option 110-1 is "want a new account". There can be a number of desired functions and/or desired outcomes defined using the "Given" option 110-1 for a particular automation step. The number of desired functions defined by the "Given" option 110-1 can include a number of interactions with the UI mockup 102. For example, if the "Given" option 110-1 includes creating a new account, the interaction with the UI mockup 102 can include clicking on an image (e.g., link associated with a word and/or image, etc.) within a different (e.g., previous, etc.) UI mockup.

The "When" option 110-2 can include a number of interactions with the UI mockup 102. For example, the "When" option 110-2 can include interactions that can perform a particular automation step. The "When" option 110-2 can be a number of interactions with the UI mockup 102 to perform the "Given" option 110-1. For example, if the "Given" option 110-1 includes "want a new account", the "When" option 110-2 can include filling in a form within the UI mockup 102 to complete creating a new account. In this example, the form can include a number of features including, but not limited to, a first name feature 124, a last name feature 126, an email address feature 128, an address feature 130, etc. The UI mockup can include a number of UI widgets (e.g., UI features, etc.) that when incorporated with a functional UI can perform a number of functions.

Selecting the "When" option 110-2 can be used to record a number of interactions with the UI mockup 102. For example, the "When" option 110-2 can be selected to display a number of interactions (e.g., automation steps, etc.) for completing the "When" option 110-2. In this example, the record button 104 can be selected by a user (e.g., UI designer, UI developer, etc.) and a number of interactions with the UI mockup 102 can be performed by the user to add additional interactions to the "When" option 110-2. The interaction with the UI mockup 102 by the user can be recorded and displayed within the "When" option. For example, an interaction with the UI mockup 102 can include clicking on the first name feature 124 and typing "John" within the first name feature 124. The interaction of clicking on and typing "John" within the first name feature 124 can be displayed at 112. The interaction of typing a name into the first name feature 124 can be recorded within the "When" option 110-2 to display that when the name is entered into the first name feature 124 it is an automation step with the "When" option 110-2. A number of other interactions can be performed with the UI interface 102 and be displayed within the "When" option 110-2 as a set of automation steps.

An interaction with the last name feature 126 can result in displaying "type Doe in last name text box" 114. An interaction with the email address feature 128 (e.g., typing in a user email address, etc.) can result in displaying "type John.Doe@hp.com in email textbox" 116.

A number of check boxes can be selected by a user during the interactions with the UI interface 102. For example, check box main account 132 can be selected and can result in displaying "check main account check box" 118.

In addition, a number of buttons can be clicked and/or selected as a number of interactions with the UI interface 102. For example, submit button 134 can be clicked and/or selected and can result in displaying "click on submit button" 122.

The "Then" option 110-3 can include a resulting function if the interactions displayed within the "When" option 110-2 are completed. For example, the "Then" option 110-3 can include giving access to the new account. In this example, the access to the new account can result in a new mock UI interface that includes a number of features of the new account.

The automation steps 106 can be adjusted to reflect a number of program requirements for the executable software specification to be executed on a particular program. For example, the automation steps can include an error that can be adjusted to reflect the program requirements. In this example, the error can include the automation step having a check box at an incorrect location. The error can be detected using the executable software specification as a test script and/or a user can utilize a number of snapshots to determine if an error occurs. In this example, the check box can be rearranged and/or deleted to reflect the program requirements.

The automation steps 106 can each be selected to display the number of interactions within each automation step 106. Each of the number of interactions can be used to manually or automatically bind and/or link an interaction with the UI mockup to an active link and/or object within a real UI. For example, if a particular feature within the mock UI 102 includes an interaction that selecting the particular feature results in directing the UI to www.yahoo.com, then the particular feature can be linked to www.yahoo.com. That is, when a user selects the particular feature the user will be directed to www.yahoo.com.

The recorded interactions for each of the automation steps and features within each automation step can be saved in a number of different formats. The formats can include an executable software specification (e.g., executable test script and program requirements, etc.) and/or snapshots (e.g., image files of the interactions with the UI mockup, etc.) of the interaction with the UI mockup 102. The snapshots can include a visual representation of the UI mockup interactions. For example, a particular snapshot can display a selection of the first name feature 124. In another example, a particular snapshot can display inserting text "John" into the first name feature 124. The snapshots can be displayed as an additional visual aid for a software developer to view the number of interactions of the user with the UI mockup 102.

As described herein, a format can include an executable software specification for the number of interactions with the UI mockup 102. For example, the recorded user interactions with the UI mockup can be used to generate an executable software specification for performing the number of interactions within each feature. The executable software specification can be used similar to a program test script and used to run a number of tests (e.g., functionality test script to test the function of a UI, load test script to test a load of a UI, etc.).

The executable software specification can also be used to define a number of program requirements. The number of program requirements can include a number of desired features and/or functions of the program. For example, the number of program requirements for creating a new account can include inserting: a first name, a last name, an email address, and an address, etc. In this example, the number of features can include the first name feature 124, the last name feature 126, the email address feature 128 and the address feature 130. Interactions with each of the features can be recorded to obtain acceptable interactions with each feature and to determine the number of program requirements for creating a new account.

That is, the recorded interactions and/or automation steps with the UI mockup 102 can be used to generate the executable software specification that can serve as a test script for a program prior to generating the program and can also serve as a number of program requirements for generating the program.

Figure 2:
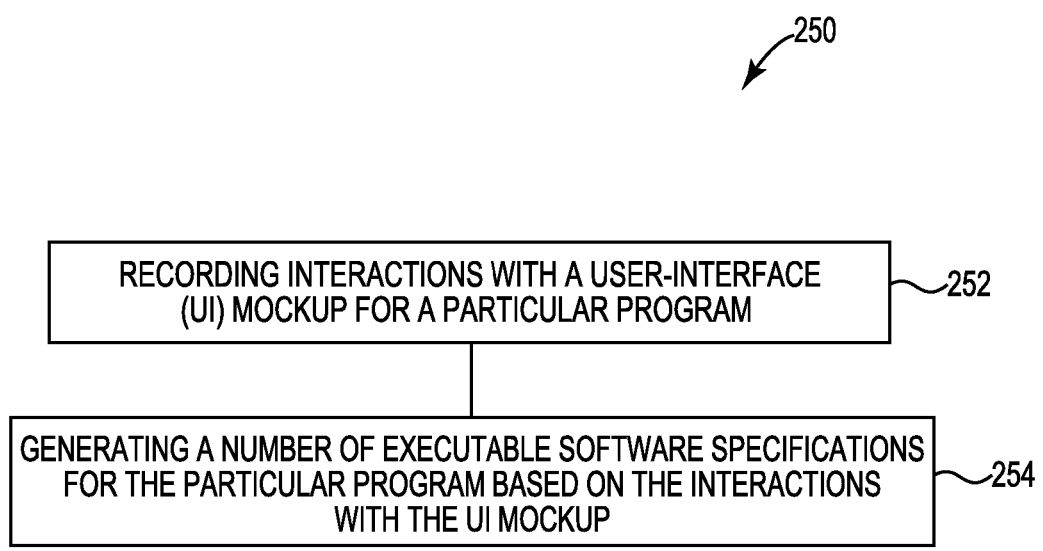
FIG. 2 illustrates a flow diagram for an example of a method for generating executable software specification according to the present disclosure.

FIG. 2 illustrates a flow diagram for an example of a method 250 for generating executable software specification according to the present disclosure. The executable software specification that is generated by the method 250 can be used as a test script for a particular program and/or define a number of program requirements for the particular program. The executable software specification can be generated by a UI mockup recorded.

The UI mockup recorder can include a UI mockup for a program that is in a development phase (e.g., prior to writing functional code for the UI, etc.). The UI mockup can be a visual representation of what a UI for a program will look like after a program developer writes functional code for the program. The UI mockup recorder can record interactions with the UI mockup and generate code for performing the recorded interactions.

At 252, interactions with a user-interface (UI) mockup are recorded for a particular program. The UI mockup can be used to record a number of interactions performed by user with the UI mockup. The UI mockup can include a UI mockup 102 coupled to a UI mockup recorder 101 as described herein in reference to FIG. 1.

The UI mockup can be a visual representation of a UI that may not include written computer readable instructions to perform functions. For example, the UI mockup may not have functionality to perform desired functions of the program but only include a display and/or template with a number of features. In another example, the UI mockup can include a number of features to create a new account (e.g., first name feature, last name feature, social security number feature, etc.) for a particular program, however the UI mockup may not be able to actually create an account for the particular program. That is, the UI mockup may not include computer readable instructions that can be executed by a processor to perform functions such as creating the account for the particular program.

Interactions with the UI mockup can include, but are not limited to, selecting features, inserting text into features, selecting boxes, clicking buttons, selecting links, and various other features that can be performed within a web page and/or application. Each interaction with the UI mockup can be recorded as a snapshot. The snapshot for each interaction with the UI mockup can be utilized for a visual representation of the interactions with the UI mockup. The snapshots can be displayed for a user (e.g., software developer, software designer, etc.) to view each interaction with the UI mockup.

At 254, a number of executable software specifications are generated for the particular program based on the interactions with the UI mockup. Each of the interactions with the UI mockup can be recorded and used by the UI mockup recorder to generate the executable software specification for the particular program. Each of the interactions can be defined to have a particular function. For example, creating a new account using a UI mockup can include selecting a number of features and inserting text into a number of features within the UI mockup. In this example, each selection can be defined to result in a particular function and each insertion of text can be defined to result in a particular function. Each interaction with the UI mockup can be recorded to create and display a number of automation steps.

The automation steps can be analyzed to determine if the interaction with a real UI would provide functionality and/or performance. For example, the automation steps can be executed by the UI mockup recorder using the executable software specification to determine if the interactions with the UI mockup have a possibility of creating problems. Each automation step can be linked to a real UI based on the feature and/or function of the automation step. For example, if the feature is a text box to receive a first name (e.g., first name feature 129, etc.), the feature can be linked to executable computer readable instructions that can receive the first name text string and determine if the first name text string was inserted correctly.

By defining a particular function for each of the interactions the executable software specification can be generated to reflect each of the interactions and a corresponding particular function. For example, the executable software specification can be generated to execute the particular functions for each of the recorded interactions with the UI mockup. The executable software specification can include a test script that can be utilized for functional and/or load testing of a web page and/or application of the UI mockup prior to generating the computer readable instructions of the web page and/or application.

That is, the test script of the executable software specification can be used to test a functionality and/or load of a particular web page and/or application prior to generating the computer readable instructions that when executed perform various functions of the particular web page and/or application.

Figure 3:
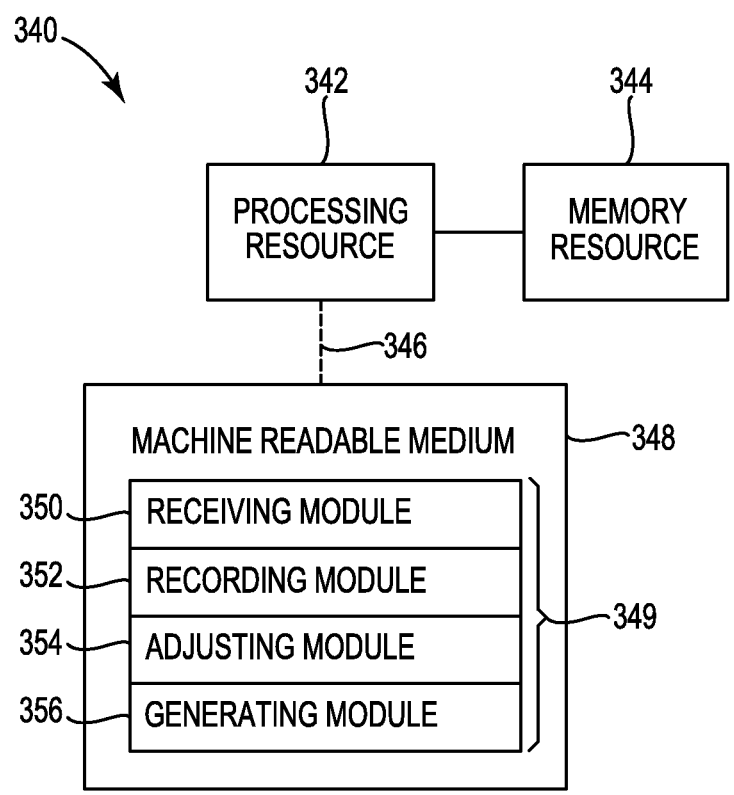
FIG. 3 illustrates a diagram of an example of a computing device according to the present disclosure.

FIG. 3 illustrates a diagram of an example of a computing device 340 according to the present disclosure. The computing device 340 can utilize software, hardware, firmware, and/or logic to generate an executable software specification by recording a number of interactions with a UI mockup.

The computing device 340 can be any combination of hardware and program instructions configured to generate an executable software specification from a recorded number of interactions with a UI mockup. The hardware, for example can include one or more processing resources 342, memory resources 344, and/or machine readable medium (MRM) 348 (e.g., computer readable medium (CRM), database, etc.). The program instructions (e.g., computer-readable instructions (CRI) 349) can include instructions stored on the MRM 348 and executable by the processing resources 342 to implement a desired function (e.g., recording interactions with a user-interface (UI) mockup for a particular program, generating a number of executable software specification for the particular program based on the interactions with the UI mockup, etc.).

MRM 348 can be in communication with a number of processing resources 342. The number of processing resources 342 is not limited to the number shown in FIG. 3. The processing resources 342 can be in communication with a tangible non-transitory MRM 348 storing a set of CRI 349 executable by the processing resources 342, as described herein. The CRI 349 can also be stored in remote memory managed by a server and represent an installation package that can be downloaded, installed, and executed. The computing device 340 can include memory resources 344, and the processing resources 342 can be coupled to the memory resources 342.

Processing resources 342 can execute CRI 349 that can be stored on an internal or external non-transitory MRM 348. The processing resources 342 can execute CRI 349 to perform various functions, including the functions described in FIG. 1 and FIG. 2. For example, the processing resources 342 can execute CRI 349 to design a user interface (UI) mockup for a particular program.

The CRI 349 can include a number of modules 350, 352, 354, 356. The number of modules 350, 352, 354, 356 can include CRI that when executed by the processing resources 342 can perform a number of functions.

The number of modules 350, 352, 354, 356 can be sub-modules of other modules. For example, the adjusting module 354 and the generating module 356 can be sub-modules and/or contained within the same computing device (e.g., computing device 340). In another example, the number of modules 350, 352, 354, 356 can comprise individual modules at separate and distinct locations (e.g., machine readable medium, etc.).

A receiving module 350 can include CRI that when executed by the processing resources 342 can perform a number of receiving functions. The receiving module 350 can receive various interactions with a UI mockup. For example, the receiving module 350 can receive a designed template of a UI mockup.

A recording module 352 can include CRI that when executed by the processing resources 342 can perform a number of recording functions. The recording module 352 can record a number of interactions with the UI mockup and store the number of interactions to a corresponding automation step and/or corresponding option.

An adjusting module 354 can include CRI that when executed by the processing resources 342 can perform a number of adjusting functions. The adjusting module 354 can adjust the number of automation steps to increase performance and/or functionality of the UI.

A generating module 356 can include CRI that when executed by the processing resources 342 can perform a number of generating functions. The generating module 356 can generate a UI automation acceptance test to run the executable software specification as a test script for the UI mockup. That is, the generating module 356 can perform a performance test of a program prior to generating the executable instructions for the program by using the generated executable software specification as a test script.

A non-transitory MRM 348, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The non-transitory MRM 348 can be integral, or communicatively coupled, to a computing device, in a wired and/or a wireless manner. For example, the non-transitory MRM 348 can be an internal memory, a portable memory, a portable disk, or a memory associated with another computing resource (e.g., enabling CRIs to be transferred and/or executed across a network such as the Internet).

The MRM 348 can be in communication with the processing resources 342 via a communication path 346. The communication path 346 can be local or remote to a machine (e.g., a computer) associated with the processing resources 342. Examples of a local communication path 346 can include an electronic bus internal to a machine (e.g., a computer) where the MRM 348 is one of volatile, non-volatile, fixed, and/or removable storage medium in communication with the processing resources 342 via the electronic bus.

The communication path 346 can be such that the MRM 348 is remote from the processing resources (e.g., 342), such as in a network connection between the MRM 348 and the processing resources (e.g., 342). That is, the communication path 346 can be a network connection. Examples of such a network connection can include a local area network (LAN), wide area network (WAN), personal area network (PAN), and the Internet, among others. In such examples, the MRM 348 can be associated with a first computing device and the processing resources 342 can be associated with a second computing device (e.g., a Java® server). For example, a processing resource 342 can be in communication with a MRM 348, wherein the MRM 348 includes a set of instructions and wherein the processing resource 342 is designed to carry out the set of instructions.

The processing resources 342 coupled to the memory resources 344 can execute CRI 349 to receive a number of interactions with a user interface (UI) mockup. The processing resources 342 coupled to the memory resources 344 can also execute CRI 349 to record the number of interactions as a number of automation steps. The processing resources 342 coupled to the memory resources 344 can also execute CRI 349 to adjust the recorded number of automation steps as an executable software specification to reflect a number of program requirements to be executed on a particular program. Furthermore, the processing resources 342 coupled to the memory resources 344 can execute CRI 349 to generate a UI automation acceptance test using the executable software specification.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed is:

1. A method for generating executable software specification, comprising:
   recording an interaction with a user-interface (UI) mockup for a particular program, wherein recording the interaction includes recording a user interaction with the particular program and a corresponding function of the particular program that results from the user interaction;
   displaying on a UI mockup recorder, a result of the recorded interaction;
   generating a snapshot of the recorded interaction, wherein the snapshot includes a visual representation of the result of the recorded interaction; and
   generating an executable software specification for the particular program that includes the generated snapshot and is based on the recorded interaction with the UI mockup, wherein the executable software specification includes a test script and a plurality of program requirements for the particular program.

2. The method of claim 1, comprising recording a plurality of automation steps associated with the particular program, wherein the recorded interaction is related to performing an automation step among the plurality of automation steps.

3. The method of claim 2, wherein each of the plurality of automation steps includes a scenario with a number of features associated with performing the automation step.

4. The method of claim 2, wherein recording a plurality of automation steps includes storing the plurality of automation steps as the plurality of the program requirements for the particular program.

5. The method of claim 1, wherein recording the interactions includes storing the snapshot of the interaction.

6. The method of claim 1, comprising reviewing the executable software specification by executing the test script of the particular program.

7. The method of claim 6, wherein reviewing the executable software specification includes verifying a plurality of desired outcomes for the particular program.

8. A non-transitory machine-readable medium storing a set of instructions executable by a processor to cause a computer to:
   design a user interface (UI) mockup for a particular program;
   record a plurality of interactions with the UI mockup, wherein each of the plurality of interactions comprise a particular function for the particular interaction;
   generate a plurality of snapshots of the recorded interactions, wherein each of the plurality of snapshots includes a visual representation of a different respective interaction among the plurality of interactions: and
   generate an executable software specification that includes the generated snapshots and is based on the plurality of interactions with the UI mockup, wherein the executable software specification includes a test script and a plurality of program requirements for the particular program.

9. The medium of claim 8, wherein each of the plurality of program requirements represents a particular function of the particular program.

10. The medium of claim 8, wherein the UI mockup is a visual simulation of the particular program prior to development of the particular program.

11. A system for executable software specification generation, the system comprising a processing resource in communication with a non-transitory machine readable medium, wherein the non-transitory machine readable medium includes a set of instructions and wherein the processing resource is designed to carry out instructions to:
   receive a plurality of interactions with a user interface (UI) mockup;
   record the plurality of interactions as a plurality of automation steps, wherein each automation step among the plurality of automation steps includes a scenario related to performing the respective automation step;
   generate a flow of snapshots of the recorded interactions, wherein the flow of snapshots includes a visual representation of the plurality of interactions from a beginning of a scenario among the plurality of scenarios to an end of the scenario;
   adjust the recorded plurality of automation steps to reflect a plurality of program requirements to be executed on a particular program; and
   generate an executable software specification that includes the generated flow of snapshots and is based on the plurality of interactions with the UI mockup, wherein generate the executable software specification includes to perform a functionality test.

12. The system of claim 11, wherein the plurality of interactions with the UI mockup initiate automation steps for a plurality of functions for the particular program.

13. The system of claim 11, wherein the plurality of automation steps are displayed to show a flow of the plurality of interactions.

14. The method of claim 11, further comprising defining a particular outcome for each automation step among the plurality of automation steps.

15. The system of claim 11, wherein generating the executable software specification includes performing a load test using the executable software specification.

16. The system of claim 11, wherein the instructions to adjust the recorded plurality of automation steps include instructions to:
   detect an error in an automation step among the plurality of automation steps; and
   correct the detected error to reflect the plurality of program requirements.

* * * * *